United States Patent
Kim et al.

(10) Patent No.: US 8,973,438 B2
(45) Date of Patent: Mar. 10, 2015

(54) INERTIAL SENSOR AND METHOD OF MANUFACTURING THE SAME

(75) Inventors: Jong Woon Kim, Seoul (KR); Sung Jun Lee, Gyunggi-do (KR); Won Kyu Jeung, Seoul (KR); Min Kyu Choi, Incheon (KR); Heung Woo Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 275 days.

(21) Appl. No.: 13/275,397

(22) Filed: Oct. 18, 2011

(65) Prior Publication Data

US 2013/0036818 A1     Feb. 14, 2013

(30) Foreign Application Priority Data

Aug. 8, 2011    (KR) .......................... 10-2011-0078638

(51) Int. Cl.
| | |
|---|---|
| *G01P 1/02* | (2006.01) |
| *G01P 15/12* | (2006.01) |
| *G01P 15/09* | (2006.01) |
| *G01C 19/5769* | (2012.01) |
| *G01C 19/5755* | (2012.01) |
| *G01P 15/08* | (2006.01) |

(52) U.S. Cl.
CPC ........ *G01C 19/5769* (2013.01); *G01C 19/5755* (2013.01); *G01P 15/08* (2013.01); *G01P 15/0802* (2013.01); *G01P 2015/084* (2013.01)
USPC .......................... 73/493; 73/514.33; 73/514.34

(58) Field of Classification Search
USPC ........ 73/514.33, 514.34, 514.36, 493, 514.38
See application file for complete search history.

(56) References Cited

U.S. PATENT DOCUMENTS

| | | | | |
|---|---|---|---|---|
| 5,284,057 | A * | 2/1994 | Staller et al. ................ | 73/514.36 |
| 5,351,542 | A * | 10/1994 | Ichimura et al. ........... | 73/514.33 |
| 5,895,853 | A * | 4/1999 | Shiota ......................... | 73/514.36 |
| 6,892,578 | B2 * | 5/2005 | Saitoh et al. ................ | 73/514.33 |
| 6,892,579 | B2 * | 5/2005 | Ohtoyo et al. .............. | 73/514.33 |
| 7,004,030 | B2 * | 2/2006 | Ikegami et al. ............. | 73/514.38 |
| 7,019,231 | B2 * | 3/2006 | Ishikawa et al. ........ | 200/61.45 R |
| 7,100,448 | B2 * | 9/2006 | Ikegami ...................... | 73/514.33 |
| 7,513,154 | B2 * | 4/2009 | Ino .................................. | 73/493 |
| 7,540,191 | B2 * | 6/2009 | Hashimoto et al. ......... | 73/514.29 |
| 7,562,575 | B2 * | 7/2009 | Hatano et al. ................... | 73/526 |
| 7,716,984 | B2 * | 5/2010 | Sakaguchi .................. | 73/514.33 |
| 7,788,976 | B2 * | 9/2010 | Shizuno ......................... | 73/493 |
| 7,845,229 | B2 * | 12/2010 | Nakatani et al. ............ | 73/514.33 |
| 8,334,984 | B2 * | 12/2012 | Perez et al. ................... | 356/519 |
| 2013/0068022 | A1 * | 3/2013 | Jeung et al. ................. | 73/514.29 |
| 2013/0081464 | A1 * | 4/2013 | Park et al. ................... | 73/504.12 |
| 2013/0167640 | A1 * | 7/2013 | Lim et al. ................... | 73/514.01 |

* cited by examiner

*Primary Examiner* — Helen Kwok
(74) *Attorney, Agent, or Firm* — Ladas & Parry, LLP (57) ABSTRACT

Disclosed herein are an inertial sensor and a method of manufacturing the same. The inertial sensor 100 according to a preferred embodiment of the present invention is configured to include a plate-shaped membrane 110, a mass body 120 disposed under a central portion 113 of the membrane 110, a post 130 disposed under an edge 115 of the membrane 110 so as to support the membrane 110, and a bottom cap 150 of which the edge 153 is provided with the first cavity 155 into which an adhesive 140 is introduced, wherein the adhesive 140 bonds an edge 153 to a bottom surface of the post, whereby the edge 153 of the bottom cap 150 is provided with the first cavity 155 to introduce the adhesive 140 into the first cavity 155, thereby preventing the adhesive 140 from being permeated into the post 130.

15 Claims, 7 Drawing Sheets

Prior Art

INERTIAL SENSOR AND METHOD OF MANUFACTURING THE SAME

CROSS REFERENCE TO RELATED APPLICATION

This application claims the benefit of Korean Patent Application No. 10-2011-0078638, filed on Aug. 8, 2011, entitled "Inertial Sensor and Method of Manufacturing the Same", which is hereby incorporated by reference in its entirety into this application.

BACKGROUND OF THE INVENTION

1. Technical Field

The present invention relates to an inertial sensor and a method of manufacturing the same.

2. Description of the Related Art

Recently, an inertial sensor has been used in various fields, for example, the military, such as an artificial satellite, a missile, an unmanned aircraft, or the like, vehicles, such as an air bag, electronic stability control (ESC), a black box for a vehicle, or the like, hand shaking prevention of a camcorder, motion sensing of a mobile phone or a game console, navigation, or the like.

The inertial sensor generally adopts a configuration in which a mass body is bonded to a flexible substrate such as a membrane, or the like, so as to measure acceleration and angular velocity. Through the configuration, the inertial sensor may calculate the acceleration by measuring inertial force applied to the mass body and may calculate the angular velocity by measuring Coriolis force applied to the mass body.

In detail, a process of measuring the acceleration and the angular velocity by using the inertial sensor will be described in detail below. First, the acceleration may be obtained by Newton's law of motion "F=ma", where "F" represents inertial force applied to the mass body, "m" represents a mass of the mass body, and "a" is acceleration to be measured. Therefore, the acceleration a may be obtained by sensing the inertial force F applied to the mass body and dividing the measured inertial force F by the mass m of the mass body that is a predetermined value. Meanwhile, the angular velocity may be obtained by Coriolis force "F=2 mΩ·v", where "F" represents the Coriolis force applied to the mass body, "m" represents the mass of the mass body, "Ω" represents the angular velocity to be measured, and "v" represents the motion velocity of the mass body. Among others, since the motion velocity v of the mass body and the mass m of the mass body are values that are known in advance, the angular velocity Ω may be obtained by sensing the Coriolis force (F) applied to the mass body.

As described above, when the inertial sensor measures the acceleration a, the mass body is displaced by the inertial force (F). In addition, when the inertial sensor measures the angular velocity (Ω), the mass body needs to be vibrated at the motion velocity v. As described above, in order to measure the acceleration "a" or the angular velocity (Ω), the mass body needs to be moved and the bottom portion of the mass body is provided with a cap so as to protect the moving mass body.

Figure 1:
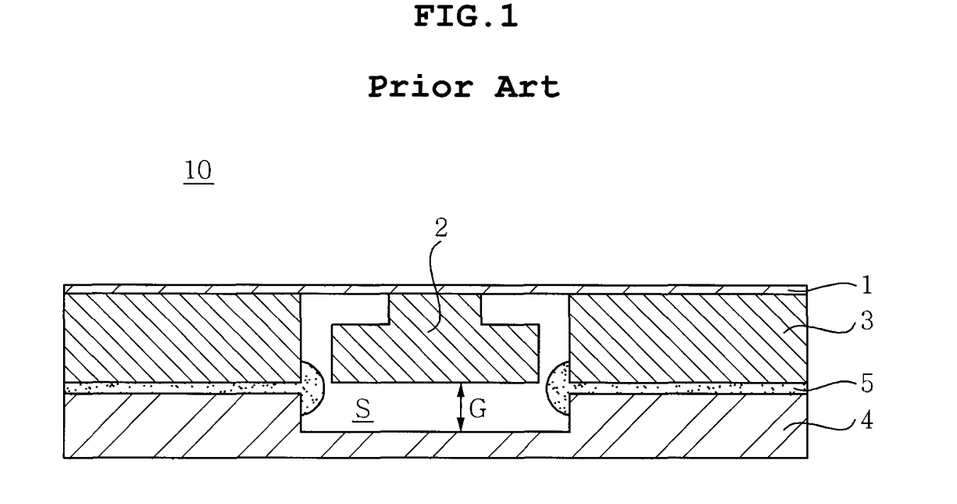
FIG. 1 is a cross-sectional view of an inertial sensor according to the prior art.

FIG. 1 is a cross-sectional view of an inertial sensor according to the prior art. As shown in FIG. 1, an inertial sensor 10 according to the prior art is configured to include a membrane 1, a mass body 2, a post 3, and a cap 4. In this configuration, a gap G between the mass body 2 and the cap 4 affects dynamic characteristics of the inertial sensor 10 in connection with a damping force of air for the mass body 2. The gap G between the mass body 2 and the cap 4 is affected by a thickness of an adhesive 5 that bonds the post 3 to the cap 4. However, a generally used adhesive 5 has low viscosity, such that it is difficult to control the thickness of the adhesive. As a result, it is very difficult to precisely implement the gap G between the mass body 2 and the cap 4. As such, when the gap G between the mass body 2 and the cap 4 is not precisely implemented, the dynamic characteristics of the inertial sensor 10 may be deteriorated.

In addition, when the post 3 and the cap 4 are bonded to each other so as to thinly implement the adhesive 5, the adhesive 5 having low viscosity is permeated into the post 3 when pressing the post 3 and the cap 4. As such, when the adhesive 5 is permeated into the post 3, a space (S) between the mass body 2 and the cap 4 is reduced and thus, the damping force of air for the mass body 2 is changed, thereby deteriorating the dynamic characteristics of the inertial sensor 10 and causing dispersion changing quality during mass production. In addition, when an amount of the adhesive 5 permeating into the post 3 is increased, the adhesive 5 is directly bonded to the mass body 2, thereby causing the defects of the inertial sensor 10.

SUMMARY OF THE INVENTION

The present invention has been made in an effort to provide an inertial sensor including a first cavity disposed on a bottom cap bonding to a post so as to introduce an adhesive thereinto, thereby preventing the adhesive from being permeated into the post and including a spacer disposed between the post and the bottom cap, thereby precisely implementing a gap between the post and the bottom cap, and a method of manufacturing the same.

According to a preferred embodiment of the present invention, there is provided an inertial sensor, including: a plate-shaped membrane; a mass body disposed under a central portion of the membrane; a post disposed under an edge of the membrane so as to support the membrane; and a bottom cap of which the edge is provided with a first cavity into which an adhesive is introduced, the adhesive bonding the edge to a bottom surface of the post so as to cover the mass body and the post.

The inertial sensor may further include a spacer having a predetermined thickness disposed between the post and the bottom cap, wherein a gap between the bottom surface of the post and a top surface of the bottom cap is equal to the predetermined thickness.

The spacer may be disposed along the outermost side or the innermost side between the post and the bottom cap.

The bottom cap may be provided with at least the two first cavities.

A central portion of the bottom cap may be provided with a concave portion depressed in a thickness direction so as to be spaced apart from the mass body.

The concave portion may be provided with a stopper protruded in a direction of the mass body.

The spacer having the predetermined thickness may be disposed between the post and the bottom cap, the gap between the bottom surface of the post and the top surface of the bottom cap may be equal to the predetermined thickness, the concave portion may be provided with the stopper protruded in the direction of the mass body, and the gap between the bottom surface of the mass body and the top surface of the stopper may be equal to the predetermined thickness.

According to a preferred embodiment of the present invention, there is provided a method of manufacturing an inertial sensor, including: (A) preparing a bottom cap; (B) forming a first cavity at an edge of the bottom cap; (C) preparing a plate-shaped membrane, a mass body disposed under a central portion of the membrane, and a post disposed under the edge of the membrane so as to support the membrane; and (D) bonding the edge of the bottom cap to the bottom surface of the post with an adhesive so as to cover the mass body and the post and introducing the adhesive into the first cavity.

The method of manufacturing an inertial sensor may further include: after step (A), forming a spacer having a predetermined thickness on the top surface of the bottom cap, wherein at step (D), the gap between the bottom surface of the post and the top surface of the bottom cap is equal to the predetermined thickness.

At the forming of the spacer, the spacer may be disposed along the outermost side or the innermost side between the post and the bottom cap.

The method of manufacturing an inertial sensor may further include after step (D), removing a portion corresponding to the top portion of the spacer in the membrane and the post, a portion corresponding to the bottom portion of the spacer in the bottom cap, and the spacer.

The forming of the spacer may include: forming an oxide layer, a plating layer, or a photoresist layer on the bottom cap; and forming the spacer by selectively patterning the oxide layer, the plating layer, or the photoresist layer.

At step (B), the first cavity is formed by selectively etching the bottom cap.

At step (B), at least the two first cavities may be formed.

The method of manufacturing an inertial sensor may further include: after step (A), forming a concave portion depressed in a thickness direction at the central portion of the bottom cap, wherein at step (D), the concave portion is spaced apart from the mass body.

At the forming of the concave portion, the concave portion may be formed by selectively etching the bottom cap.

The method of manufacturing an inertial sensor may further include at the forming of the concave portion, forming a stopper protruded in a direction of the mass body on the concave portion.

The method of manufacturing an inertial sensor may further include simultaneously forming the first cavity, the concave portion, and the stopper by selectively etching the bottom cap.

According to another exemplary embodiment of the present invention, there is provided an inertial sensor, including: a plate-shaped membrane; a mass body disposed under a central portion of the membrane; a post disposed under an edge of the membrane so as to support the membrane; and an upper cap of which the edge is provided with a second cavity into which an adhesive is introduced, the adhesive bonding the edge to a top surface of the membrane so as to cover the membrane.

The inertial sensor may further include a spacer having a predetermined thickness disposed between the membrane and the upper cap, wherein a gap between the top surface of the membrane and a bottom surface of the upper cap is equal to the predetermined thickness.

A central portion of the upper cap may be provided with a concave portion depressed in a thickness direction so as to be spaced apart from the membrane.

The spacer having the predetermined thickness may be disposed between the membrane and the upper cap, the gap between the top surface of the membrane and the bottom surface of the upper cap is equal to the predetermined thickness, the concave portion is provided with the stopper protruded in the direction of the membrane, and the gap between the top surface of the membrane and the bottom surface of the stopper is equal to the predetermined thickness.

DESCRIPTION OF THE PREFERRED EMBODIMENTS

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

Figure 2:
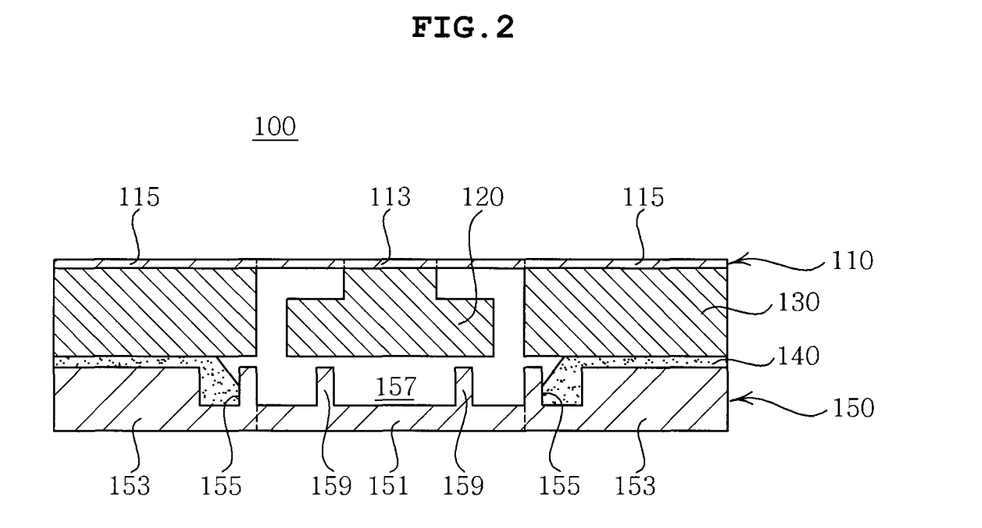
FIGS. 2 to 4 are cross-sectional views of an inertial sensor according to a preferred embodiment of the present invention.

FIGS. 2 to 4 are cross-sectional views of an inertial sensor according to a preferred embodiment of the present invention.

As shown in FIGS. 2 to 4, an inertial sensor 100 according to a preferred embodiment of the present invention is configured to include a plate-shaped membrane 110, a mass body 120 disposed under a central portion 113 of the membrane 110, a post 130 disposed under an edge 115 of the membrane 110 so as to support the membrane 110, and a bottom cap 150 of which the edge 153 is provided with the first cavity 155 into which an adhesive 140 is introduced, wherein the adhesive 140 bonds an edge 153 to a bottom surface of the post 130 so as to cover the mass body 120 and the post 130.

The membrane 110 is formed in a plate shape to have elasticity that displaces the mass body 120. In this configuration, a boundary of the membrane 110 is not accurately partitioned, but may be partitioned into a central portion 113 of the membrane 110 and an edge 115 disposed along an outside of the membrane 110. In this configuration, the mass body 120 is disposed under the central portion 113 of the membrane 110, such that the central portion 113 of the membrane 110 is displaced corresponding to the motion of the mass body 120. In addition, the bottom portion of the edge 115 of the membrane 110 is provided with the post 130 to serve to support the central portion 113 of the membrane 110. Meanwhile, the mass body 120 may be vibrated by disposing a driving unit or a displacement of the mass body 120 may be measured by disposing a sensing unit, due to elastic deformation between the central portion 113 and the edge 115 of the membrane 110. However, the driving unit and the sensing unit are not necessarily disposed between the central portion 113 and the edge 115 of the membrane 110. Therefore, one of the driving unit and the sensing unit may be disposed at the central portion 113 or the edge 115 of the membrane 110 In this case, the driving unit or the sensing unit may be implemented using a piezoelectric type, a piezoresistive type, a capacitive type, or the like, that are known to those skilled in the art.

The mass body 120 is displaced by an inertial force or a Coriolis force and is disposed under the central portion 113 of the membrane 110. In addition, the post 130 is formed in a hollow shape to support the membrane 110, thereby securing a space in which the mass body 120 may be displaced. In this case, the post 130 is disposed under the edge 115 of the membrane 110. In this configuration, the mass body 120 may be formed in, for example, a cylindrical shape and the post 130 may be formed in a square column shape of which the center is provided with a cavity having a cylindrical shape. That is, when being viewed from a cross-section, the mass body 120 is formed in a circular shape and the post 130 is formed in a square shape of which the center is provided with a circular opening. However, the shape of the mass body 120 and the post 130 is not limited thereto and thus, the mass body 120 and the post 130 may be formed in all the shapes that are known to those skilled in the art.

The above-mentioned mass body 120 and post 130 may be simultaneously formed by selectively etching a silicon substrate, or the like. As such, when the mass body 120 and the post 130 are simultaneously formed by etching, the bottom surface of the mass body 120 and the bottom surface of the post 130 have the same height.

The bottom cap 150 covers the bottom portions of the mass body 120 and the post 130 to serve to protect the bottom portion of the inertial sensor 100, wherein the edge 153 of the bottom cap 150 is bonded to the bottom surface of the post 130 with the adhesive 140. In this case, the adhesive 140 generally uses epoxies having low viscosity, such that a portion of the adhesive 140 may be permeated into the post 130 when the post 130 and the bottom cap 150 are pressed so as to be bonded to each other. However, the edge 153 of the bottom cap 150 is provided with a first cavity 155, such that the adhesive 140 is introduced into the first cavity 155 by a surface tension, thereby suppressing the adhesive 140 from being permeated into the post 130. Therefore, it is possible to prevent the dynamic characteristics of the inertial sensor 100 from being deteriorated due to the permeation of the adhesive 140 and suppress dispersion generation changing quality. In addition, the adhesive 140 is permeated into the post 130 to prevent the post 130 from being directly bonded to the mass body 120, thereby preventing the defects of the inertial sensor 100. Meanwhile, one first cavity 155 into which the adhesive 140 is introduced may be formed at the edge 153 of the bottom cap 150 in an annular shape (see FIGS. 2 to 3A), but the number of first cavities 155 is not limited thereto. Therefore, at least the two first cavities 155 may be formed in an annular shape according to an amount of the adhesive 140 (see FIG. 3B).

In addition, the central portion 151 of the bottom cap 150 may be provided with a concave portion 157 depressed in a thickness direction so as to be spaced apart from the mass body 120. The central portion 151 of the bottom cap 150 is provided with the concave portion 157 to reduce the damping force of air applied to the mass body 120, thereby improving the dynamic characteristics. In addition, the concave portion 157 may be provided with a stopper 159 formed by being protruded in a direction of the mass body 120. In this configuration, the stopper 159 serves to restrict the downward displacement of the mass body 120. In particular, when the inertial sensor 100 collides with the ground by free falling, a very large force is applied to the mass body 120, such that the membrane 110 bonded to the mass body 120 may be destroyed. The stopper 150 restricts the downward displacement of the mass body 120, thereby preventing the membrane 110 from being destroyed.

Simultaneously forming the above-mentioned first cavity 155, concave portion 157, and stopper 159 by selectively etching the bottom cap 150 may simply the manufacturing process. As such, when the concave portion 157 and the stopper 159 are simultaneously formed by the etching, the top surface of the stopper 159 and the top surface of the bottom cap 150 have the same height.

Figure 3A:
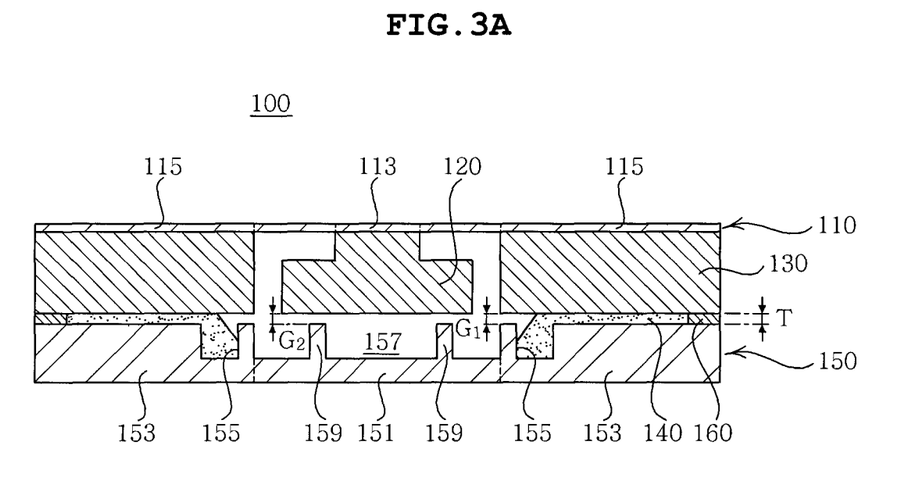
Figure 3B:
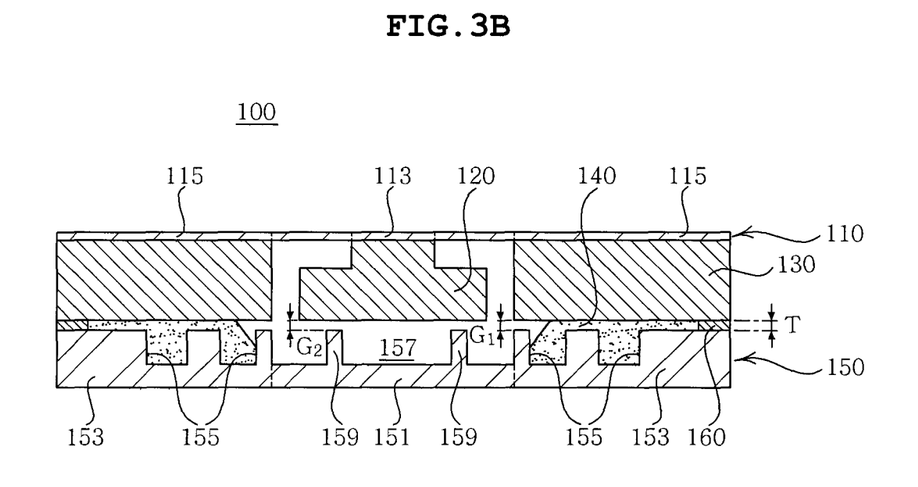
Figure 4A:
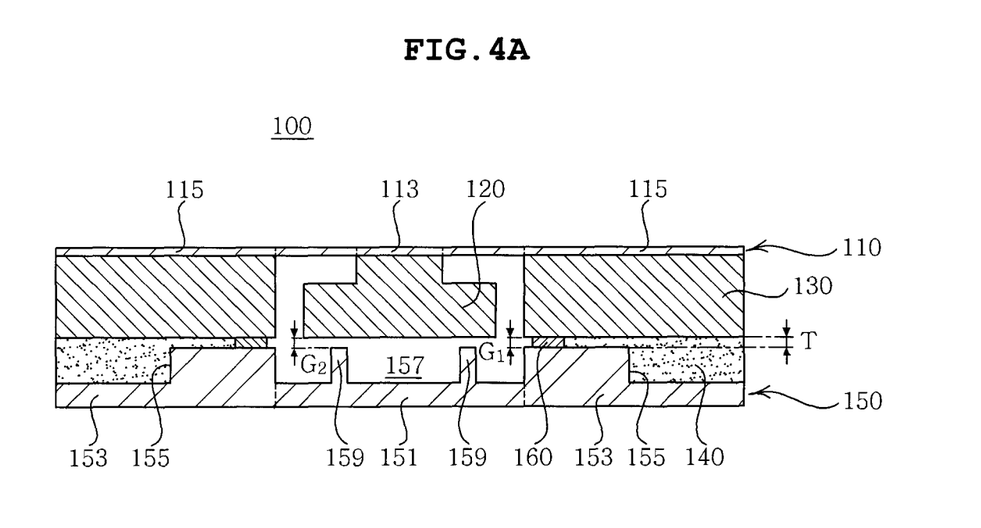
Figure 4B:
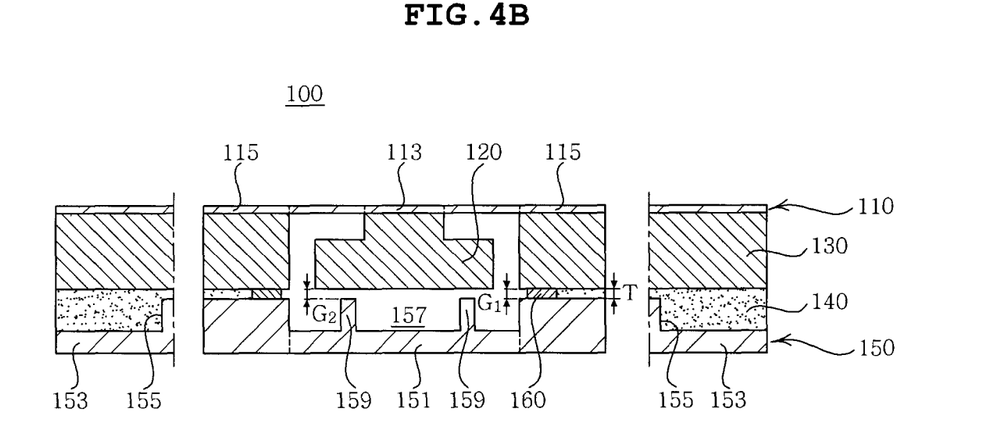

Meanwhile, as shown in FIGS. 3 and 4, a spacer 160 having a predetermined thickness T may be disposed between the post 130 and the bottom cap 150. In this configuration, the spacer 160 serves to constantly space the bottom surface of the post 130 and the top surface of the bottom cap 150 from each other, regardless of the viscosity of the adhesive 140. In detail, a gap $G_1$ between the bottom surface of the post 130 and the top surface of the bottom cap 150 is equal to a predetermined thickness T of the spacer 160. The spacer 160 is disposed between the post 130 and the bottom cap 150 to precisely implement the gap $G_1$ between the post 130 and the bottom cap 150 with high yield while using the existing bonding process, thereby improving the dynamic characteristics of the inertial sensor 100. In addition, the spacer 160 may be disposed along the outermost side between the post 130 and the bottom cap 150 so as to prevent the adhesive 140 from being leaked to the outside of the inertial sensor 100 (see FIGS. 3A to 3B).

However, the spacer 160 is not necessarily disposed along the outermost side between the post 130 and the bottom cap 150. Therefore, the spacer 160 may be disposed along the innermost side between the post 130 and the bottom cap 150 (see FIG. 4A). As such, the spacer 160 is disposed along the innermost side between the post 130 and the bottom cap 150, thereby more efficiently preventing the adhesive 140 from being permeated into the post 130. Meanwhile, the innermost side between the post 130 and the bottom cap 150 is provided with the spacer 160, such that the first cavity 155 may be removed, if necessary, when the first cavity 155 is formed at the outside of the spacer 160 (see FIG. 4B). In detail, a portion corresponding to the top portion of the first cavity 155 in the membrane 110 and the post 130 and the edge 153 of the bottom cap 150 provided with the first cavity 155 may be removed by cutting. That is, the edge of the inertial sensor 100 is vertically cut so as to remove the first cavity 155.

In addition, as described above, when the bottom surface of the mass body 120 and the bottom surface of the post 130 have the same height by simultaneously forming the mass body 120 and the post 130 by the etching and the top surface of the stopper 159 and the top surface of the bottom cap 150 have the same height by simultaneously forming the concave portion 157 and the stopper 159 by the etching, the gap $G_1$ between the bottom surface of the post 130 and the top surface of the bottom cap 150 is equal to a gap $G_2$ between the bottom surface of the mass body 120 and the top surface of the stopper 159. However, the gap $G_1$ between the bottom surface of the post 130 and the top surface of the bottom cap 150 is equal to a predetermined thickness T of the spacer 160, such that the gap $G_2$ between the bottom surface of the mass body 120 and the top surface of the stopper 159 is equal to the predetermined thickness T of the spacer 160. As a result, the gap $G_2$ between the mass body 120 and the stopper 159 may be controlled by controlling the thickness of the spacer 160, thereby more precisely restricting the downward displacement of the mass body 120. Therefore, even though the inertial sensor 100 free-falls, it is possible to prevent the membrane 110 bonded to the mass body 120 from being destroyed.

However, a meaning "height or gap is the same" described throughout the specification does not mean exactly the same mathematically and includes a significant change such as machining errors occurring during the manufacturing process.

FIGS. 5 to 14 are cross-sectional views sequentially showing the process of manufacturing an inertial sensor according to a preferred embodiment of the present invention.

As shown in FIGS. 5 to 14, a method of manufacturing the inertial sensor 100 according to a preferred embodiment of the present invention is configured to include (A) preparing the bottom cap 150, (B) forming the first cavity 155 at the edge 153 of the bottom cap 150, (C) preparing the plate-shaped membrane 110, the mass body 120 disposed under the central portion 113 of the membrane 110 and the post 130 disposed under the edge 115 of the membrane 110 so as to support the membrane 110, and (D) bonding the edge 153 of the bottom cap 150 to the bottom surface of the post 130 with the adhesive 140 so as to cover the mass body 120 and the post 130, and introducing the adhesive 140 into the first cavity 155.

Figure 5:
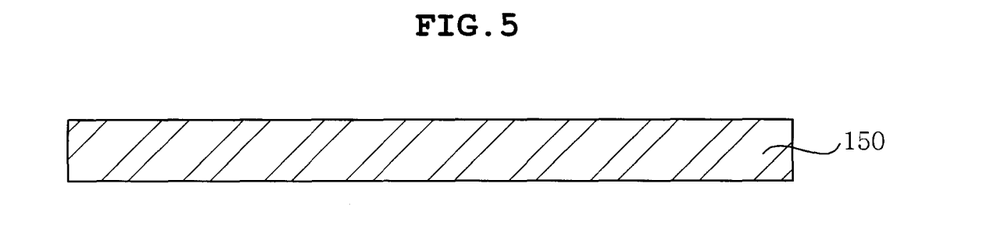
FIGS. 5 to 14 are cross-sectional views sequentially showing the process of manufacturing an inertial sensor according to a preferred embodiment of the present invention.

First, as shown FIG. 5, the bottom cap 150 is prepared. In this case, the bottom cap 150 covers the bottom portion of the mass body 120 and the post 130 to serve to protect the bottom portion of the inertial sensor 100 and may use the silicon substrate that facilitates the etching process. However, as the bottom cap 150, the silicon substrate is not necessarily used. Therefore, a metal substrate, a resin substrate, or the like, may be used.

Figure 6:
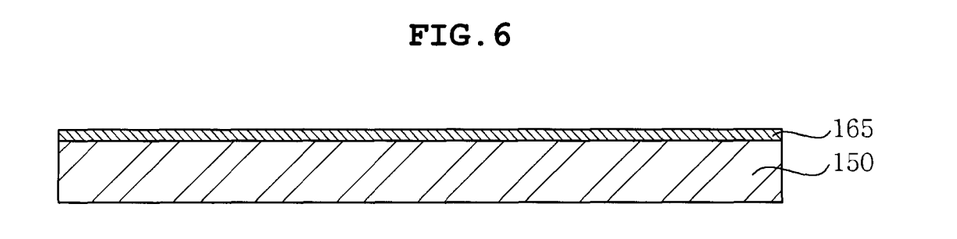
Figure 7:
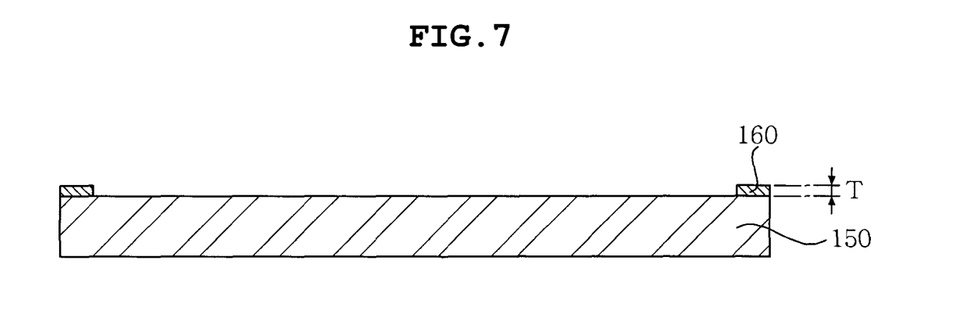

Next, as shown in FIGS. 6 and 7, the spacer 160 is provided. The spacer 160 serves to finally control the gap $G_1$ between the post 130 and the bottom cap 150. In this case, the spacer 160 is formed to have the predetermined thickness T on the top surface of the bottom cap 150 and preferably, is formed along the outermost side of the top surface of the bottom cap 150. In addition, the spacer 160 may be formed using an oxide layer made of silicon oxide ($SiO_2$), a plating layer made of copper, nickel, aluminum, or the like, a photoresist layer 165 made of a dry film, a liquid photosensitive material, or the like. In detail, describing a process of forming the spacer 160, the oxide layer, the plating layer, or the photoresist layer 165 is first formed on the top surface of the bottom cap 150 (see FIG. 6) and then, the oxide layer, the plating layer, or the photoresist layer 165 is selectively patterned by etching (in the case of the oxide layer, the plating layer) or exposure/development (in the case of the photoresist layer) to form the spacer 160 (see FIG. 7).

Figure 8:
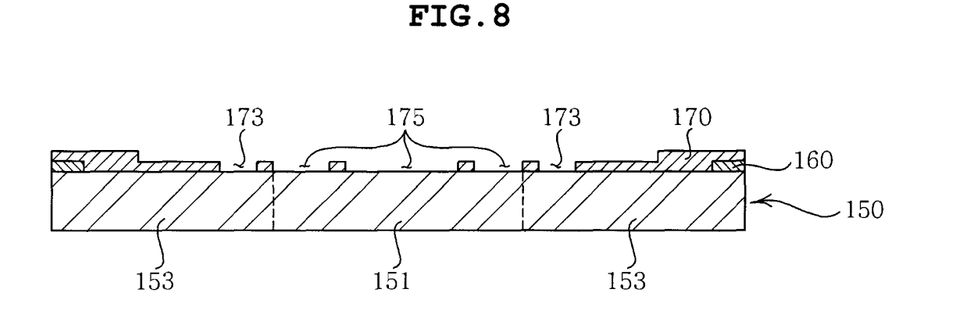
Figure 9:
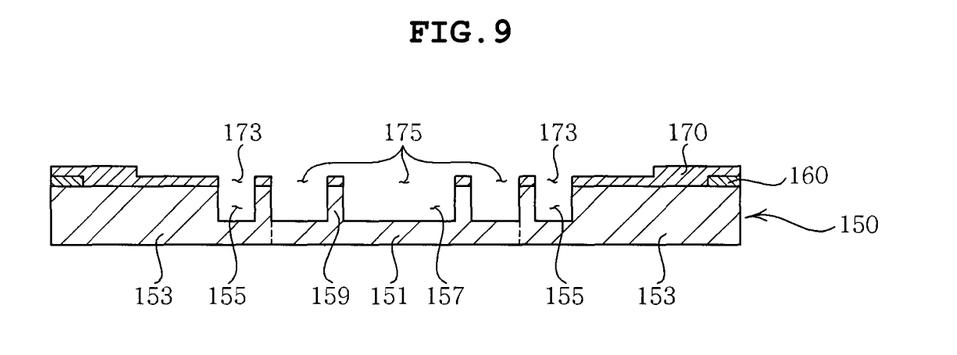
Figure 10:
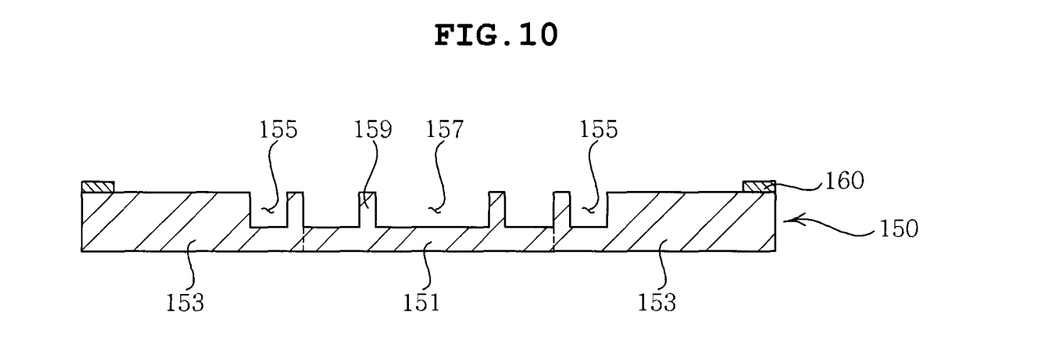

Next, as shown in FIGS. 8 to 10, the first cavity 155 is formed at the edge 153 of the bottom cap 150. In this case, the first cavity 155 is a portion in which the adhesive 140 is finally introduced and may be formed by selectively etching the bottom cap 150. In detail, describing a process of forming the first cavity 155, an etching resist layer 170 (the dry film, the liquid photosensitive material, or the like) is first applied to the top surface of the bottom cap 150, the etching resist layer 170 is patterned by the exposure/development so as to be provided with a first open portion 173 (see FIG. 8), and then, the first cavity 155 is formed by selectively etching the bottom cap 150 exposed from the first open part 173 by the etching (see FIG. 9). Meanwhile, the one first cavity 155 is formed in the drawings, but at least the two first cavities 155 may be formed according to an amount of the adhesive 140 (see FIG. 3B).

In addition, when the edge 153 of the bottom cap 150 is provided with the first cavity 155, the central portion 151 of the bottom cap 150 may be provided with the concave portion 157 and the concave portion 157 may be provided with the stopper 159. That is, during the process of forming the first cavity 155, the concave portion 157 and the stopper 159 are formed by modifying the patterning of the etching resist layer 170, together with the first cavity 155. In detail, describing the process of forming the concave portion 157 and the stopper 159, together with the first cavity 155, the etching resist layer 170 (the dry film, the liquid photosensitive material, or the like) is first applied to the top surface of the bottom cap 150 and the etching resist layer 170 is patterned by the exposure/development so as to be provided with the second open part 175, together with the first open part 173 (see FIG. 8). Thereafter, the first cavity 155 is formed at a portion corresponding to the first open part 173 by selectively etching the bottom cap 150 exposed from the first open part 173 and the second open part 175 by the etching, the concave portion 157 is formed at a portion corresponding to the second open part 175, and the stopper 159 is formed at a portion corresponding between the second open parts 175 (see FIG. 9). As such, the first cavity 155, the concave portion 157, and the stopper 159 may be simultaneously formed by only modifying the patterning of the etching resist layer 170, thereby simplifying the manufacturing process.

Meanwhile, as shown in FIG. 10, after the first cavity 155, the concave portion 157, and the stopper 159 are formed, the etching resist layer 170 completes its own role and thus, are removed.

Figure 11:
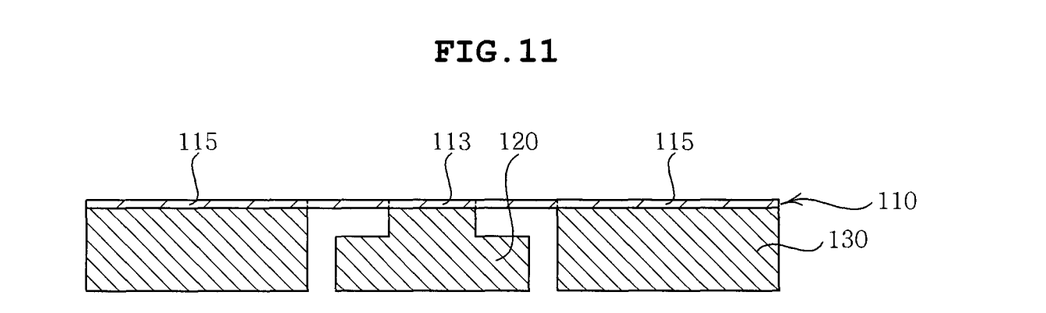

Next, as shown in FIG. 11, the membrane 110, the mass body 120 disposed under the central portion 113 of the membrane 110, and the post 130 disposed under the edge 115 of the membrane 110 so as to support the membrane 110 are prepared. In this case, the mass body 120 and the post 130 may be formed by selectively etching the silicon substrate, or the like.

Figure 12:
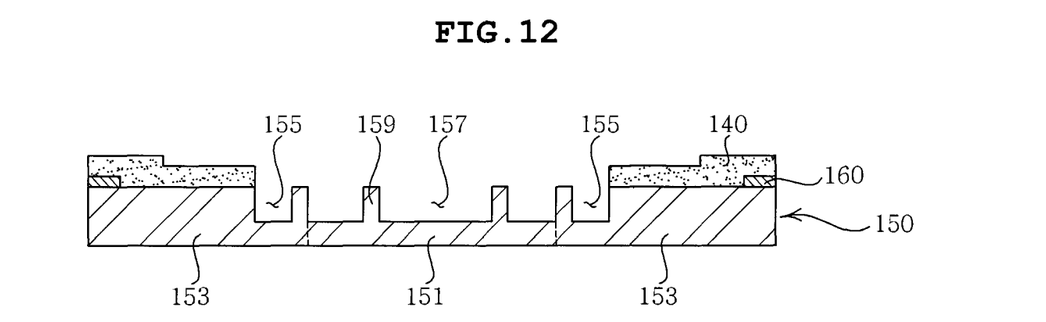
Figure 13:
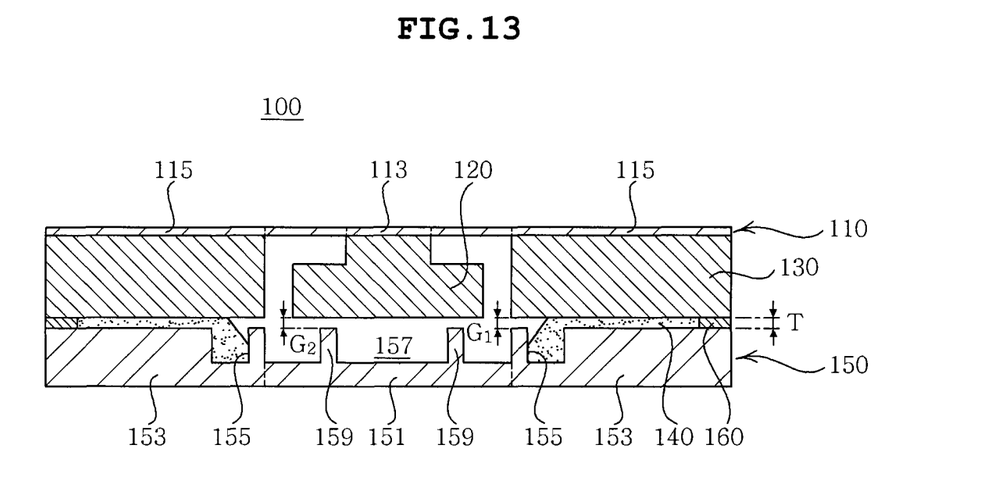

Next, as shown in FIGS. 12 and 13, the edge 153 of the bottom cap 150 is bonded to the bottom surface of the post 130 with the adhesive 140 and the adhesive 140 is introduced into the first cavity 155. In detail, the adhesive 140 is applied to the edge 153 of the bottom cap 150 (see FIG. 12) and then, the edge 153 of the bottom cap 150 is bonded to the bottom surface of the post 130 with the adhesive 140, thereby covering the mass body 120 and the post 130 with the bottom cap 150 (see FIG. 13). Meanwhile, pressure or heat may be applied while bonding the bottom surface of the post 130 to the edge 153 of the bottom cap 150. In addition, when the edge 153 of the bottom cap 150 is bonded to the bottom surface of the post 130, the surplus adhesive 140 is introduced into the first cavity 155 formed on the bottom cap 150 (see FIG. 13). In this case, the first cavity 155 may be subjected to surface treatment capable of increasing wettability with the adhesive 140 so as to effectively introduce the adhesive 140 into the first cavity 155. As such, the adhesive 140 is introduced into the first cavity 155, thereby preventing the adhesive 140 from being permeated into the post 130.

Meanwhile, when the edge 153 of the bottom cap 150 is bonded to the bottom surface of the post 130, the thickness of the adhesive 140 may be changed but the spacer 160 maintains the predetermined thickness T, such that the gap $G_1$ between the bottom surface of the post 130 and the top surface of the bottom cap 150 is equal to the predetermined thickness T of the spacer 160. Consequently, the gap $G_1$ between the post 130 and the bottom cap 150 may be controlled by controlling the predetermined thickness T of the spacer 160, such that the gap $G_1$ between the post 130 and the bottom cap 150 may be precisely implemented.

In addition, since the central portion 151 of the bottom cap 150 is formed so that the concave portion 157 is depressed in the thickness direction, when the bottom cap 150 is bonded to the post 130, the concave portion 157 of the bottom cap 150 is spaced apart from the mass body 120. As a result, the concave portion 157 may improve the dynamic characteristics by reducing the damping force of air applied to the mass body 120.

Figure 14:
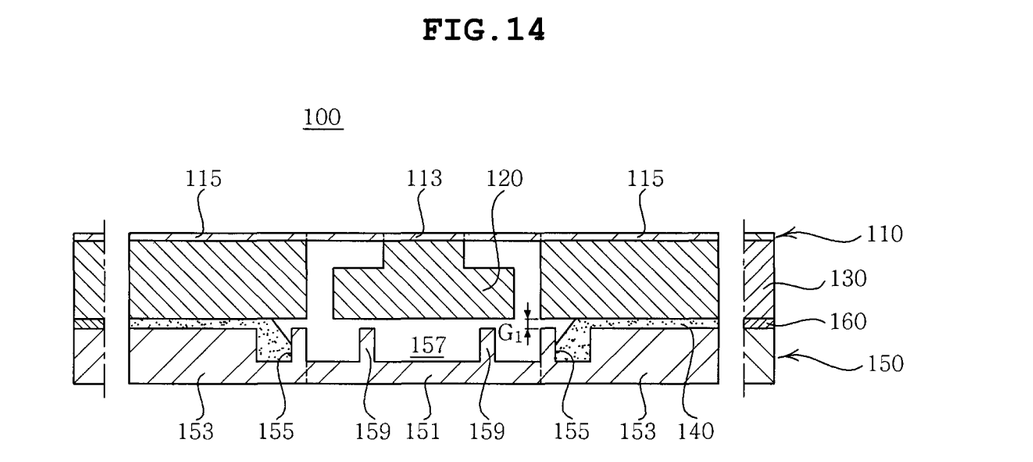

Next, as shown in FIG. 14, the spacer 160 is removed by cutting the edge of the inertial sensor 100. The spacer 160 serves to control the gap $G_1$ between the post 130 and the bottom cap 150, such that the spacer 160 may be removed when the gap $G_1$ is constantly maintained by completely bonding the bottom cap 150 to the post 130 with the adhesive 140. In detail, the portion corresponding to the top portion of the spacer 160 in the membrane 110 and the post 130 and the portion corresponding to under the spacer 160 in the bottom cap 150, and the spacer 160 may be removed by the cutting. That is, the edge of the inertial sensor 100 is vertically cut so as to remove the spacer 160. However, the process is selective and thus, the spacer 160 may not be removed so as to maintain the structural stability of the inertial sensor 100.

Figure 15:
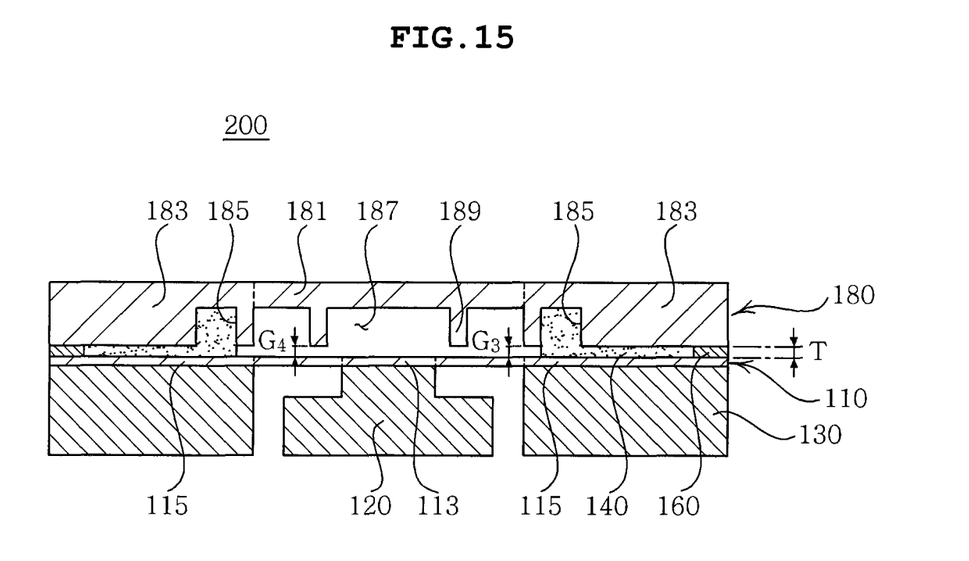
FIG. 15 is a cross-sectional view of an inertial sensor according to another preferred embodiment of the present invention.

FIG. 15 is a cross-sectional view of an inertial sensor according to another preferred embodiment of the present invention.

As shown in FIG. 15, an inertial sensor 200 according to a preferred embodiment of the present invention is configured to include the plate-shaped membrane 110, the mass body 120 disposed under the central portion 113 of the membrane 110, a post 130 disposed under the edge 115 of the membrane 110 so as to support the membrane 110, and an upper cap 180 of which the edge 183 is provided with a second cavity 185 into which the adhesive 140 is introduced, wherein the adhesive 140 bonds the edge 183 to the top surface of the membrane 110 so as to cover the membrane 110.

The inertial sensor 100 according to the above-mentioned preferred embodiment is based on the bottom cap 150, but the inertial sensor 200 according to the preferred embodiment of the present invention is based on the upper cap 180. Except for this aspect, other components are the same. Therefore, the preferred embodiment of the present invention is described based on the upper cap 180 and the overlapping content with the above-mentioned preferred embodiment of the present invention will be omitted.

The upper cap 180 covers the top portion of the membrane 110 to serve to protect the top portion of the inertial sensor 200, wherein the edge 183 of the upper cap 180 is bonded to the top surface of the membrane 110 with the adhesive 140. When the upper cap 180 is bonded to the membrane 110, a portion of the adhesive 140 may be permeated in a direction of the central portion 113 of the membrane 110. However, the edge 183 of the upper cap 180 is provided with the second cavity 185, such that the adhesive 140 is introduced into the second cavity 185, thereby suppressing the adhesive 140 from being permeated in a direction of the central portion 113 of the membrane 110. Therefore, it is possible to prevent the dynamic characteristics of the inertial sensor 200 from being deteriorated due to the permeation of the adhesive 140 and suppress the dispersion generation of the rigidity of the membrane 110. Meanwhile, the one second cavity 185 into which the adhesive 140 is introduced may be formed in an annular shape, but is not limited thereto. Therefore, at least the two second cavities 185 may be formed in an annular shape.

In addition, the central portion 181 of the upper cap 180 is provided with the concave portion 187 depressed in the thickness direction so as to be spaced apart from the membrane 110 to reduce the damping force of air applied to the membrane 110, thereby improving the dynamic characteristics. In addition, the concave portion 187 may be provided with the stopper 189 formed by being protruded in a direction of the membrane 110. In this configuration, the stopper 189 serves to restrict the upward displacement of the mass body 120.

Simultaneously forming the above-mentioned second cavity 185, concave portion 187, and stopper 189 by selectively etching the upper cap 180 may simply the manufacturing process. As such, when the concave portion 187 and the stopper 189 are simultaneously formed by the etching, the bottom surface of the stopper 189 and the bottom surface of the upper cap 180 have the same height.

Meanwhile, the spacer 160 having the predetermined thickness T may be disposed between the membrane 110 and the upper cap 180. In this configuration, the spacer 160 serves to constantly space the top surface of the membrane 110 and the bottom surface of the upper cap 180 by the predetermined thickness T of the spacer 160 from each other, regardless of the viscosity of the adhesive 140. That is, a gap $G_3$ between the top surface of the membrane 110 and the bottom surface of the upper cap 180 is equal to the predetermined thickness T of the spacer 160. The spacer 160 is provided between the membrane 110 and the upper cap 180 to precisely implement the gap $G_3$ between the membrane 110 and the upper cap 180 with high yield while using the existing bonding process, thereby improving the dynamic characteristics of the inertial sensor 200.

In addition, as described above, when the bottom surface of the stopper 189 and the bottom surface of the upper cap 180 have the same height by simultaneously forming the concave portion 187 and the stopper 189 by the etching, the gap $G_3$ between the top surface of the membrane 110 and the bottom surface of the upper cap 180 is equal to a gap $G_4$ between the top surface of the membrane 110 and the bottom surface of the stopper 189. However, the gap $G_3$ between the top surface of the membrane 110 and the bottom surface of the upper cap 180 is equal to a predetermined thickness T of the spacer 160, such that the gap $G_4$ between the top surface of the membrane 110 and the bottom surface of the stopper 189 is equal to the predetermined thickness T of the spacer 160. As a result, the gap $G_4$ between the membrane 110 and the stopper 189 may be controlled by controlling the thickness of the spacer 160, thereby more precisely restricting the upward displacement of the mass body 120. Therefore, even though the inertial sensor 100 free-falls, it is possible to prevent the membrane 110 from being destroyed.

According to the preferred embodiment of the present invention, the first cavity can be disposed on the bottom cap so as to introduce the adhesive into the first cavity when the post bonds to the bottom cap with the adhesive, thereby preventing the adhesive from being permeated into the post. Therefore, the preferred embodiment of the present invention can prevent the dynamic characteristics of the inertial sensor from being deteriorated and suppress the generation of dispersion changing the quality.

In addition, the preferred embodiment of the present invention can prevent the adhesive from being directly bonded to the mass body due to the permeation of the adhesive into the post, thereby preventing the defects of the inertial sensor.

Further, according to the preferred embodiment of the present invention, the spacer is disposed between the post and the bottom cap, thereby precisely implementing the gap between the post and the bottom cap with the high yield while using the existing bonding process. Therefore, the preferred embodiment of the present invention can improve the dynamic characteristics of the inertial sensor.

In addition, according to the preferred embodiment of the present invention, the spacer is disposed between the post and the bottom cap to precisely implement the gap between the post and the bottom cap, thereby finely implementing the gap between the stopper and the mass body that are disposed on the bottom cap. Therefore, the preferred embodiment of the present invention can improve the impact reliability of the inertial sensor.

Although the preferred embodiments of the present invention have been disclosed for illustrative purposes, they are for specifically explaining the present invention and thus an inertial sensor and a method of manufacturing the same according to the present invention are not limited thereto, but those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An inertial sensor, comprising:
a plate-shaped membrane;
a mass body disposed under a central portion of the membrane;
a post disposed under an edge of the membrane so as to support the membrane; and
a bottom cap of which the edge is provided with a cavity into which an adhesive is introduced, the adhesive bonding the edge to a bottom surface of the post so as to cover the mass body and the post,
wherein the cavity is formed as a shape of groove opened to a direction of the post and is formed on one side of a surface where the cavity is bonded to the post with the adhesive and an adhesive surface of the bottom cap forms a step so that the adhesive is prevented from being permeated toward an inner direction of the post where the mass body is positioned due to a surface tension.

2. The inertial sensor as set forth in claim 1, further comprising a spacer having a predetermined thickness disposed between the post and the bottom cap, wherein a gap between the bottom surface of the post and a top surface of the bottom cap is equal to the predetermined thickness.

3. The inertial sensor as set forth in claim 2, wherein the spacer is disposed along an outermost side or an innermost side between the post and the bottom cap.

4. The inertial sensor as set forth in claim 1, wherein the bottom cap is provided with at least two first cavities.

5. The inertial sensor as set forth in claim 1, wherein a central portion of the bottom cap is provided with a concave portion depressed in a thickness direction so as to be spaced apart from the mass body.

6. The inertial sensor as set forth in claim 5, wherein the concave portion is provided with a stopper protruded in a direction of the mass body.

7. The inertial sensor as set forth in claim 5, wherein a spacer having a predetermined thickness is disposed between the post and a bottom cap,
a gap between the bottom surface of the post and a top surface of the bottom cap is equal to the predetermined thickness,
the concave portion is provided with a stopper protruded in a direction of the mass body, and
the gap between a bottom surface of the mass body and the top surface of the stopper is equal to the predetermined thickness.

8. An inertial sensor, comprising:
a plate-shaped membrane;
a mass body disposed under a central portion of the membrane;
a post disposed under an edge of the membrane so as to support the membrane; and
an upper cap of which the edge is provided with a cavity into which an adhesive is introduced, the adhesive bonding the edge to a top surface of the membrane so as to cover the membrane,
wherein the cavity is formed as a shape of groove opened to a direction of the post and is formed on one side of a surface where the cavity is bonded to the membrane with the adhesive and an adhesive surface of the upper cap forms a step so that the adhesive is prevented from being permeated toward an inner direction of the post where the mass body is positioned due to a surface tension.

9. The inertial sensor as set forth in claim 8, further comprising a spacer having a predetermined thickness disposed between the membrane and the upper cap,
wherein a gap between the top surface of the membrane and a bottom surface of the upper cap is equal to the predetermined thickness.

10. The inertial sensor as set forth in claim 8, wherein a central portion of the upper cap is provided with a concave portion depressed in a thickness direction so as to be spaced apart from the membrane.

11. The inertial sensor as set forth in claim 10, wherein a spacer having a predetermined thickness is disposed between the membrane and the upper cap,
a gap between a top surface of the membrane and the bottom surface of the upper cap is equal to the predetermined thickness,
the concave portion is provided with a stopper protruded in a direction of the membrane, and
the gap between the top surface of the membrane and a bottom surface of the stopper is equal to the predetermined thickness.

12. The inertial sensor as set forth in claim 8, wherein the cavity is formed at the edge of the upper cap toward a direction of the mass body.

13. The inertial sensor as set forth in claim 12, wherein the cavity is formed in a "⊏" shape.

14. The inertial sensor as set forth in claim 1, wherein the cavity is formed at the edge of the bottom cap toward a direction of the mass body.

15. The inertial sensor as set forth in claim 14, wherein the cavity is formed in a "⊏" shape.

* * * * *